Jan. 3, 1933.   T. N. CLARK   1,892,979
DEVICE FOR HANDLING AUTOMOBILE WHEELS AND TIRES
Filed Feb. 1, 1932
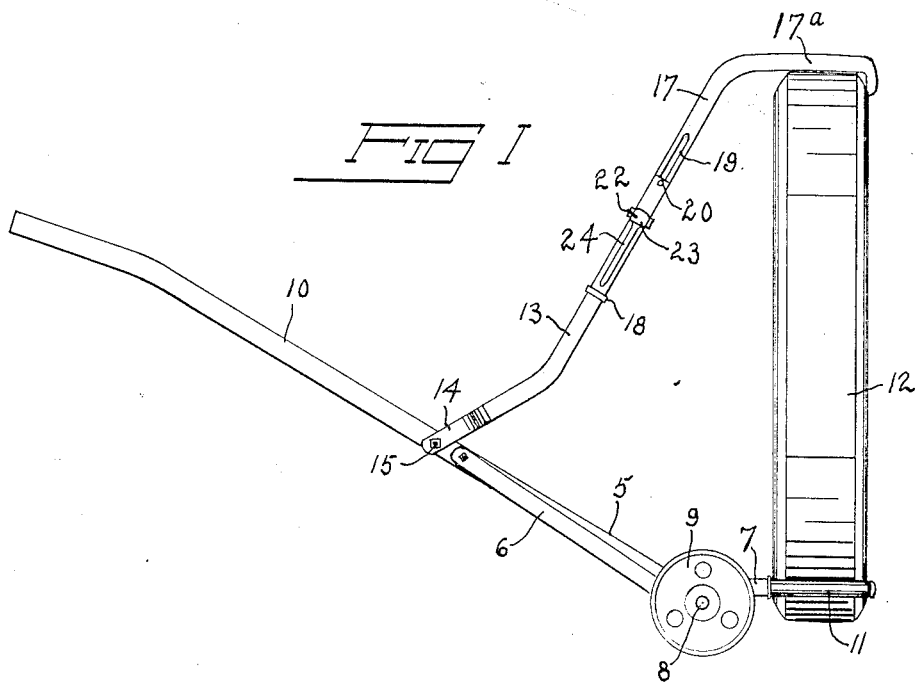
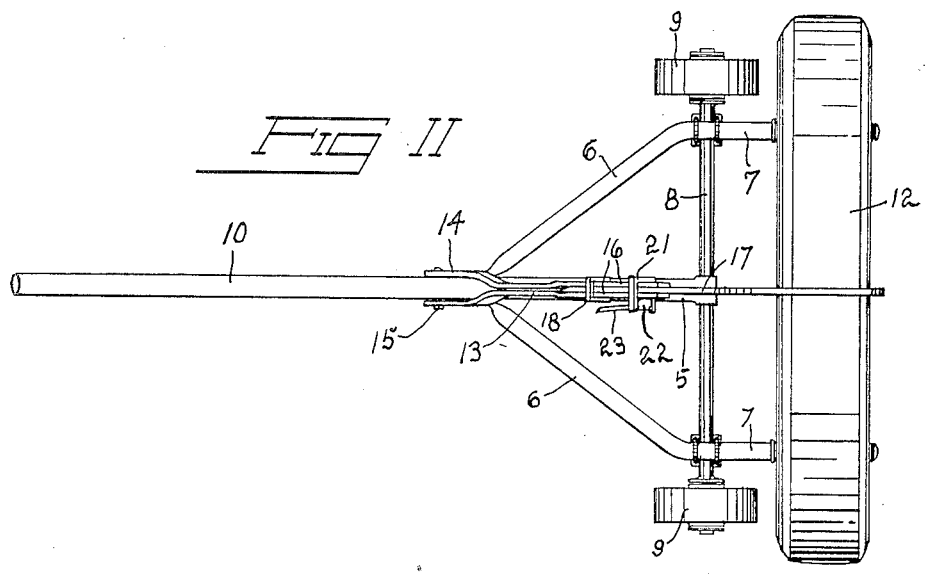
INVENTOR.
Thomas N. Clark,
BY Walter N. Haskell,
his ATTORNEY.

Patented Jan. 3, 1933

1,892,979

UNITED STATES PATENT OFFICE

THOMAS N. CLARK, OF ROCK ISLAND, ILLINOIS

DEVICE FOR HANDLING AUTOMOBILE WHEELS AND TIRES

Application filed February 1, 1932. Serial No. 590,167.

My invention has reference to a device for handling automobile wheels and tires, and is designed more specially for use in removing such parts of a heavier type from trucks and busses, and replacing the same. It is a common practice with vehicles of the kind mentioned to carry an extra wheel or two, with central disk and all complete, and in case of trouble take off one wheel and put on another, with little loss of time. On account of the weight of said wheels it is a difficult matter for one man to handle them, or in some cases two men, especially where the wheel is of the double type such as are commonly in use on the rear axles, and the total weight of which is several hundred pounds. In some cases when a vehicle is driven into a garage or repair shop it is desired to remove a wheel for the purpose of getting at the axle or spindle, for repair purposes, following which the wheel is returned to place.

The chief purpose of the present invention is to provide a convenient truck, or carrier, which can be readily engaged with a wheel in position on the axle, for the purpose of lifting the same therefrom, or of returning a wheel to such position. For this operation a portable frame is provided with special elements for engagement with the lower part of the tire, to properly support the same. Connected therewith is a special form of grapple mechanism for engagement with the upper part of the tire.

Another purpose of the invention is the provision of means for permitting the convenient rotation of a wheel supported by the invention, to bring it into a proper position for securing in place.

Another feature thereof consists in the formation of the grapple mechanism so that it will be capable of adjustment, to conform the same to tires of varying sizes.

The above named, and other features and advantages of the invention will be more fully understood from the following specification, taken in connection with the accompanying drawings, in which:—

Fig. 1 shows the invention in side elevation, as it appears when in use.

Fig. 2 is a plan view thereof.

The devices embodies a frame consisting of a central bar 5 and a pair of arms 6 connected therewith at a common point and diverging forwardly therefrom. The forward ends of said arms are bent into parallel relation with each other, as shown at 7, and fixed to said ends is a cross-shaft 8, with which the bar 5 is also connected. On the ends of the shaft 8 are carrying wheels 9, and the bar 5 is projected rearwardly into a handle 10, by means of which the device may be moved about, and through which a desired leverage may be imparted to the frame, in handling the load thereon. On account of the partially concealed position of the wheel of a truck or coach beneath the body of the vehicle the arms 7 are projected for some distance beyond the frame of the device and carrying wheels thereof, and in parallel relation with the ground.

The end-pieces 7 are provided with rollers 11, upon which is supported a wheel or tire, as indicated at 12. In case the openings in the disk of the wheel do not correspond with the attachments at the end of the axle the wheel can be turned on said rollers until the desired position is attained. In some cases the entire wheel unit is removed, including some of the brake parts, and in returning such parts it is frequently necessary to rotate the wheel in order to bring such parts into engaging positions.

The handle 10 is also provided with a grapple mechanism for the upper part of the tire, consisting of a bar 13, preferably of double formation, and provided with bifurcated end portions 14, embracing the handle, and pivotally connected therewith by a bolt 15. The bar 13 is also provided with double plates 16 at its upper end, spaced to receive the end of an arm 17, to the lower end of which is fixed a collar 18, slidable on the plates 16. The end of the arm 16 is provided with a straight end portion 17ᵃ parallel with the arms 7, and, ending in a hook for engagement with the upper part of the tire 12, as shown in the figures. The arm 17 is also provided with a slot 19, engaged by a pin 20, uniting the upper ends of the plates 16, and holding the upper end of the arm in working position. Said slot and pin also provide for a longitudinal adjustment of the arm 17 with relation to the arm 13, to increase or lessen the length of the arm 17, to conform the same to the size of the tire. Fixed to one of the plates 16 is a bracket 21, in the ends of which is pivoted an eccentric cam 22, provided with a handle 23. Upon said handle being turned downwardly as shown in the figures the plates 16 and arm 17 are clamped tightly together, preventing any movement thereof with relation to each other, and holding the grapple at the end of the arm 17 in proper position for assisting in handling a tire or wheel. By turning the handle 23 outwardly the desired adjustments can be made in the position of the arm 17.

With an automobile wheel in position in the machine it can be easily handled, and moved from one place to another. While it is of more particular use in handling the complete wheels, it can also be used for supporting and conveying the tires alone, some of which are very heavy and cumbersome. In use, the device is run up along side the wheel after the same has been disconnected from the axle, and the rollers 11 engaged with the lower part of the tire. The arm 17 is then engaged with the upper part of the tire, and the tire lifted sufficiently to loosen and release the same, the portable frame being at the same time moved in a rearward direction. To replace a wheel this operation is reversed, with the additional operation of turning the wheel in the frame, if necessary.

Changes can be made in the form and arrangement of the several parts of the invention, without departing from the spirit and scope thereof.

What I claim, and desire to secure, is:—

A device for handling automobile wheels and tires, consisting of a portable frame, provided with an operating handle, tire supports projected beyond said frame and provided with roller sleeves, and a grapple arm pivotally connected with said frame, and adopted to engage the upper part of a tire supported on said roller sleeves.

In testimony whereof, I affix my signature.

THOMAS N. CLARK.